US012592056B2

(12) United States Patent
Thomas et al.

(10) Patent No.: US 12,592,056 B2
(45) Date of Patent: Mar. 31, 2026

(54) MACHINE LEARNING AND COMPUTER VISION SOLUTIONS TO SEAMLESS VEHICLE IDENTIFICATION AND ENVIRONMENTAL TRACKING THEREFOR

(71) Applicant: Metropolis IP Holdings, LLC, Santa Monica, CA (US)

(72) Inventors: Edwin Thomas, Hermosa Beach, CA (US); June Guo, Torrance, CA (US); Ji Sung Hwang, Santa Monica, CA (US); Anil Kumar Nayak, Los Angeles, CA (US); Todd Merle Shipway, Flintstone, MD (US); Barry James O'Brien, Seattle, WA (US); Alexander David Israel, Los Angeles, CA (US)

(73) Assignee: Metropolis IP Holdings, LLC, Santa Monica, CA (US)

( * ) Notice: Subject to any disclaimer, the term of this patent is extended or adjusted under 35 U.S.C. 154(b) by 585 days.

(21) Appl. No.: 18/076,227

(22) Filed: Dec. 6, 2022

(65) Prior Publication Data

US 2024/0185566 A1 Jun. 6, 2024

(51) Int. Cl.
G06V 10/764 (2022.01)

(52) U.S. Cl.
CPC ........ G06V 10/764 (2022.01); G06V 2201/08 (2022.01)

(58) Field of Classification Search
CPC .. G06V 10/764; G06V 2201/08; G06V 20/52; G06V 20/625
See application file for complete search history.

(56) References Cited

U.S. PATENT DOCUMENTS

| | | | | |
|---|---|---|---|---|
| 6,945,303 | B2 * | 9/2005 | Weik, III | E05F 15/75 235/382 |
| 2019/0082149 | A1 * | 3/2019 | Correnti | G08B 13/19613 |
| 2019/0378347 | A1 * | 12/2019 | Gallaway | G06V 20/62 |
| 2021/0076010 | A1 | 3/2021 | Correnti et al. | |
| 2022/0051036 | A1 | 2/2022 | Vossoughi et al. | |
| 2022/0371512 | A1 | 11/2022 | Tatematsu et al. | |

(Continued)

OTHER PUBLICATIONS

PCT International Search Report and Written Opinion, PCT Application No. PCT/US2022/52029, Apr. 5, 2023, 9 pages.

(Continued)

*Primary Examiner* — John B Strege
(74) *Attorney, Agent, or Firm* — Fenwick & West LLP

(57) ABSTRACT

A device captures a series of images over time in association with a gate, each image having a timestamp. The device determines, for a vehicle approaching the entry side, from a subset of images of the series of images featuring the vehicle, a first data set comprising a plurality of parameters that describe attributes of the vehicle by inputting the subset of images into a first machine learning model and a vehicle identifier of the vehicle by inputting images of the subset featuring a depiction of a license plate of the vehicle into a second machine learning model. The device stores the data set in association with one or more timestamps with the subset of images, determines a second data set for a second vehicle approaching the exit side, and responsive to determining that the first data set and the second data set match, instructs the gate to move.

16 Claims, 6 Drawing Sheets

600:

(56)    References Cited

U.S. PATENT DOCUMENTS

| | | | |
|---|---|---|---|
| 2023/0140349 A1* | 5/2023 | Chand | G06V 20/52 |
| | | | 701/117 |
| 2025/0014363 A1* | 1/2025 | An | G06N 20/00 |
| 2025/0097388 A1 | 3/2025 | Jarkoi et al. | |
| 2025/0128698 A1* | 4/2025 | Sharma Banjade | G08G 1/148 |

OTHER PUBLICATIONS

United States Office Action, U.S. Appl. No. 18/431,738, filed May 21, 2025, 23 pages.

* cited by examiner

Figure 2:
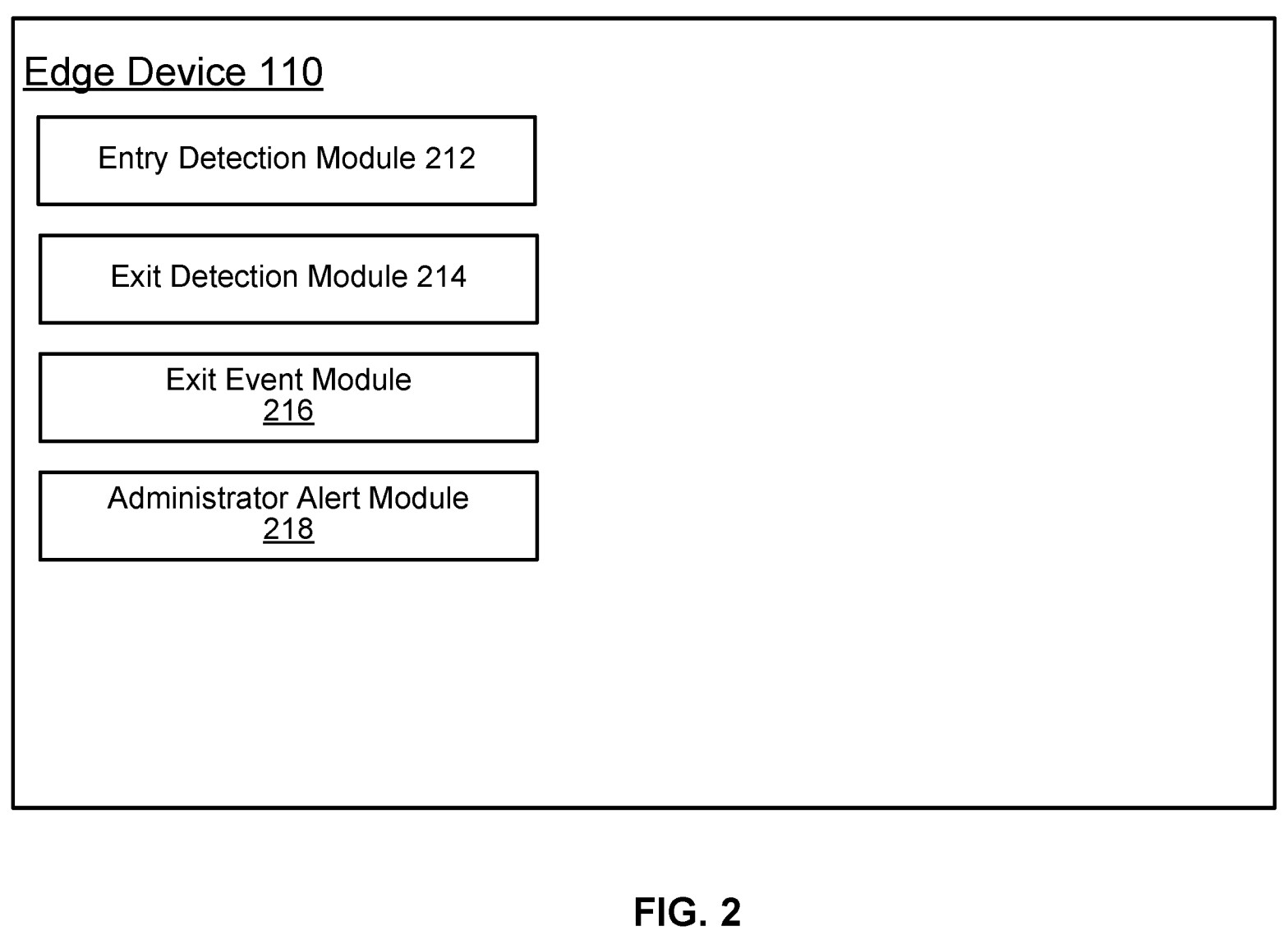

Edge Device 110

Entry Detection Module 212

Exit Detection Module 214

Exit Event Module
216

Administrator Alert Module
218

MACHINE LEARNING AND COMPUTER VISION SOLUTIONS TO SEAMLESS VEHICLE IDENTIFICATION AND ENVIRONMENTAL TRACKING THEREFOR

TECHNICAL FIELD

The disclosure generally relates to the field of machine learning and computer vision, and more particularly relates to vehicle identification and environmental tracking of identified vehicles.

BACKGROUND

Parking systems presently require a user to take a ticket or otherwise interact with a machine that lifts a gate so that the user can drive their vehicle into a parking facility. On exiting the parking facility, similar friction is encountered, where a user must again interact on the way out with the parking system. This friction alone results in traffic bottlenecks at parking gates. Problems compound based on user error (e.g., lost tickets), where it may take a long time to resolve the issue and enable the gate to open.

SUMMARY

Systems and methods are disclosed herein to fully automate the parking experience. An edge device is populated at a parking facility that receives images from connected cameras facing a vicinity of a moveable gate. The edge device inputs the received images into one or more machine learning models, which output information about vehicles depicted in the images (e.g., fingerprinting identity information of the vehicle, obtaining license plate information for the vehicle, determining direction of vehicle movement). The edge device populates event information in a database (e.g., a cloud database residing at a parking controller server). The event information may include exit entries and entry entries along with some or all of the information output by the one or more machine learning models. When an exit event is detected, a matching entry event may be located from the stored data, upon which the exit gate would be opened and the vehicle would be allowed to exit. Processing images by a cloud server may be prohibitively expensive in terms of network resources and latency in transmitting the images, thus resulting in the same delays to process the data and match entry and exit events that are experienced through manual operation. Advantageously, the edge device architecture processing data-heavy images enables cloud interactivity to be limited to small form data, thereby permitting real-time or near-real-time seamless entry and exit at gates of parking facilities.

In an embodiment, an edge device captures a series of images over time in association with a moveable gate, each image having a timestamp, the moveable gate having an entry side and an exit side and blocking passage between the entry side and the exit side unless moved. The edge device determines, for a vehicle approaching the entry side, from a subset of images of the series of images featuring the vehicle, a first data set that includes a plurality of parameters that describe attributes of the vehicle by inputting the subset of images into a first machine learning model and a vehicle identifier of the vehicle by inputting images of the subset featuring a depiction of a license plate of the vehicle into a second machine learning model. The edge device causes a data structure to be stored for the data set in association with one or more timestamps with the subset of images (e.g., using cloud storage). The edge device determines a second data set for a second vehicle approaching the exit side, and, responsive to determining that the first data set and the second data set match, the edge device instructs the moveable gate to move.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment for seamless parking gate operation using an edge device and a parking control server.

FIG. 2 illustrates one embodiment of exemplary modules operated by an edge device.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
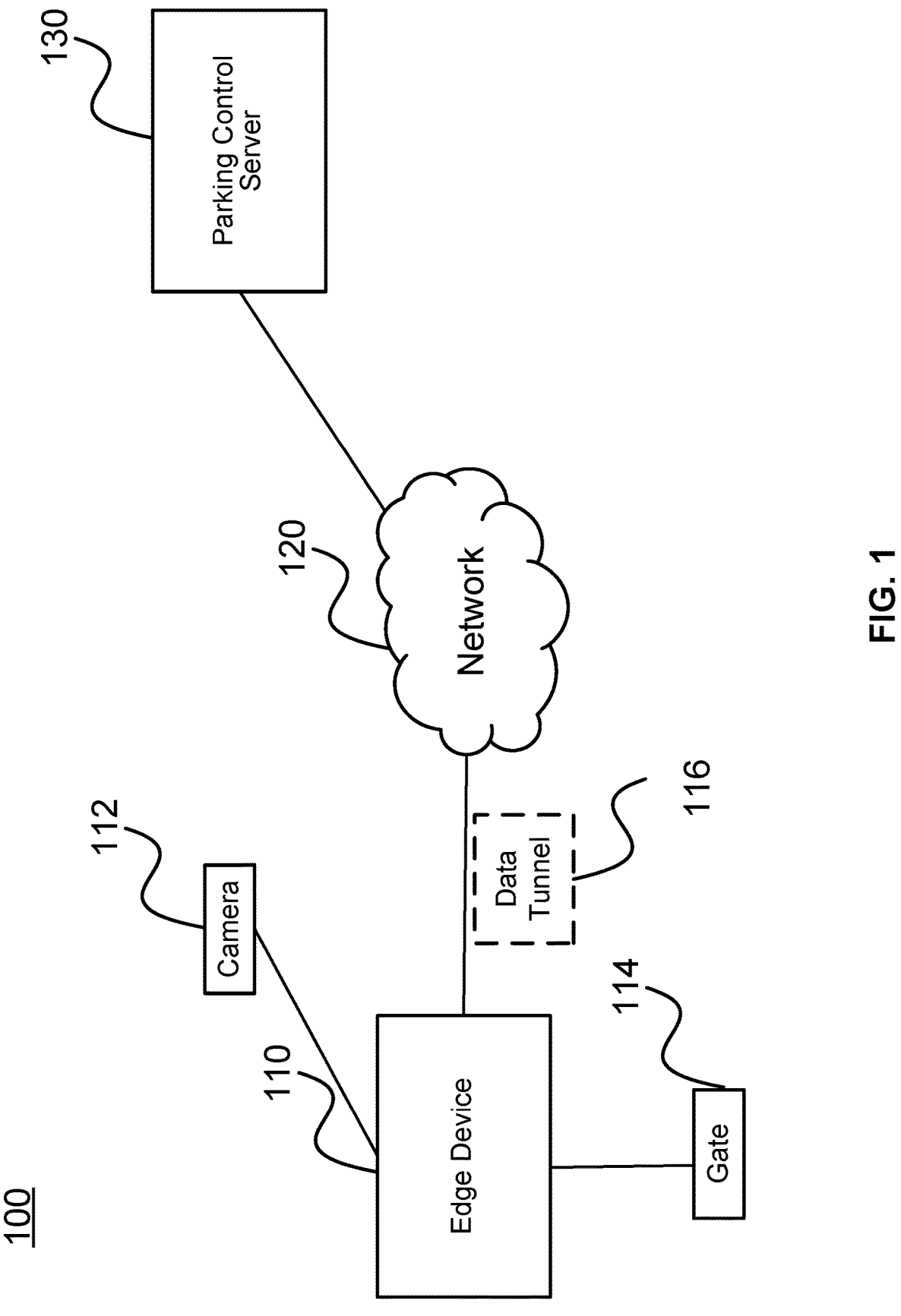

FIG. 1 illustrates one embodiment of a system environment for seamless parking gate operation using an edge device and a parking control server. As depicted in FIG. 1, environment 100 includes edge device 110, camera 112, gate 114, data tunnel 116, network 120, and parking control server 130. While only one of each feature of environment is depicted, this is for convenience only, and any number of each feature may be present. Where a singular article is used to address these features (e.g., "camera 112"), scenarios where multiples of those features are referenced are within the scope of what is disclosed (e.g., a reference to "camera 112" may mean that multiple cameras are involved).

Edge device 110 detects a vehicle approaching gate 114 using camera 112. Edge device 110, upon detecting such a vehicle, performs various operations (e.g., lift the gate; update a profile associated with the vehicle, etc.) that are described in further detail below with reference to at least FIG. 2. Camera 112 may include any number of cameras that capture images and/or video of a vehicle from one or more angles (e.g., from behind a vehicle, from in front of a vehicle, from the sides of a vehicle, etc.). Camera 112 may be in a fixed position or may be movable (e.g., along a track or line) to capture images and/or video from different angles. Where the term image is used, this may be a standalone image or may be a frame of a video. Where the term video is used, this may include a plurality of images (e.g., frames of the video), and the plurality of images may form a sequence that together form the video.

Gate 114 may be any object that blocks entry and/or exit from a facility (e.g., a parking facility) until moved. For example, gate 114 may be a pike that blocks entry or exit by standing parallel to the ground, and lifts perpendicular to the ground to allow a vehicle to pass. As another example, gate 114 may be a pole or a plurality of poles that block vehicle access until lowered to a position that is flush with the ground. Any form of blocking vehicle ingress/egress that is moveable to remove the block is within the context of gate 114. In some embodiments, no physical gate exists that blocks traffic from entering or exiting a facility. Rather, in such embodiments, gate 114 as referred to herein is a logical boundary between the inside and the outside of the facility, and all embodiments disclosed herein that refer to moving the gate equally refer to scenarios where a gate is not moved, but other processing occurs when an entry and exit match (e.g., record that the vehicle has left the facility). Yet further, gate 114 may be any generic gate that is not in direct communication with edge device 110. Edge device 110 may instead be in direct communication with a component that is separate from, but installed in association with, a gate, the component configured by installation to cause the gate to move.

Edge device 110 communicates information associated with a detected vehicle to parking control server 130 over network 120, optionally using data tunnel 116. Data tunnel 116 may be any tunneling mechanism, such as virtual private network (VPN). Network 120 may be any mode of communication, including cell tower communication, Internet communication, WiFi, WLAN, and so on. The information provided may include images of the detected vehicle. Additionally or alternatively, the information provided may include information extracted from or otherwise obtained based on the images of the detected vehicle (e.g., as described further below with respect to FIG. 2). Transmitting extracted information rather than the underlying images may result in bandwidth throughput efficiencies that enable real time or near-real-time movement of gate 114 by avoiding a need to transmit high data volume images.

Parking control server 130 receives the information from edge device 110 and performs operations based on that receipt. The operations may include storing the information, updating a profile, retrieving information related to the information, and communicating responsive additional information back to edge device 110. The operations of parking control server 130 are described in further detail below with reference to at least FIG. 3.

FIG. 2 illustrates one embodiment of exemplary modules operated by an edge device. As depicted in FIG. 2, edge device 110 includes entry detection module 212, exit detection module 214, exit event module 216, and administrator alert module 218. The modules depicted with respect to edge device 110 are merely exemplary; fewer or additional modules may be used to achieve the activity disclosed herein. Moreover, the modules of edge device 110 typically reside in edge device 110, but in various embodiments may instead, in part or in whole, reside in parking control server 130 (e.g., where images, rather than data from images, are transmitted to parking control server 130 for processing).

In an embodiment, entry detection module 212 captures a series of images over time. The images are received from camera 112. Camera 112 may continuously capture images, or may capture images when certain conditions are met (e.g., motion is detected, or any other heuristic such as during certain times of day). In an embodiment, edge device 110 may continuously receive images from camera 112 and may determine whether the images include a vehicle, in which case entry detection module 212 may perform processing on images that include a vehicle, an discard other images. In an embodiment, entry detection module 212 may command camera 112 to only transmit images that include vehicles, and may perform processing on those received images. The captured images are in association with a moveable gate or logical boundary (e.g., gate 114), in that each camera 112 is either facing a gate or an area in a vicinity of a gate (e.g., just the entry side, just the exit side, or both). Each image may have a timestamp and/or a sequence number. Entry detection module 212 may associate all images that include a motion of a given vehicle from a time the vehicle enters the images until the time that the vehicle exits the images (e.g., during the time that the vehicle approaches the gate and then drives past the gate).

Entry detection module 212 may determine, for a vehicle approaching the entry side, from a subset of images of the series of images featuring the vehicle, a first data set. The first data set may include a plurality of parameters that describe attributes of the vehicle and a vehicle identifier of the vehicle. In an embodiment, a single machine learning model is used to produce the entire first data set. In another embodiment, a first machine learning model is used to determine the plurality of parameters, and a different second machine learning model is used to determine the vehicle identifier.

The term "plurality of the parameters of the vehicle," as used herein, may refer to a set of data that includes both identifying attributes of the vehicle and direction attributes of the vehicle. The term "identifying attributes of the vehicle" may include any information that is derivable from the images that describes the vehicle, such as make, model, color, type (e.g., sedan versus sports utility vehicle), height, length, bumper style, number of windows, door handle type, and any other descriptive features of the vehicle. The term "direction attributes of the vehicle" may refer to absolute direction (e.g., cardinal direction) or relative direction (e.g., direction of the vehicle relative to an entry gate and/or relative to an assigned direction of a lane which the entry gate blocks (e.g., where different gates are used for entry and exit lanes, and where a vehicle is approaching a gate from an entrance to a parking facility through an exit lane, the direction would be indicated as opposite to an intended direction of the lane)). The "direction attributes of the vehicle" may also be determined relative to a camera's imaging access, and are thus indicative of whether the vehicle is moving toward or away from the camera. The term "subset of images" refers to a set of images that includes the vehicle and excludes other images that do not include the vehicle.

In the two-model approach, entry detection module 212 inputs the subset of images into a first machine learning model, and receives, as output from the first machine learning model, the plurality of parameters, including the identifying attributes of the vehicle and the direction of the vehicle. In an embodiment, the output of the first machine learning model may be more granular, and may include a number of objects in an image (e.g., how many vehicles), types of objects in the image (e.g., vehicle type information, or per-vehicle identifying attribute information), result scores (e.g., confidence in each object classification), and bounding boxes (e.g., of sub-segments of the image for downstream processing, such as of a license plate for use by the second machine learning model). The first machine learning model may be trained to output the identifying attributes of the vehicle using example data having images of vehicles that are labeled with one or more candidate identifying attributes. For example, various images from cameras facing gates may be manually labeled by users to indicate the above-mentioned attributes, such as, for each of the various images, a make, model, color, type, and so on of a vehicle. The first machine learning model may be a supervised model that is trained using the example data to predict, for new images, their attributes.

The first machine learning model may be trained to output the direction attributes of the vehicle using example data, and/or to output data from which entry detection module 212 may determine some or all of the direction attributes. The example data may show motion of vehicles relative to one or more gates over a series of sequential frames, and may be annotated with a lane type (e.g., an entry lane versus an exit lane) and/or a gate type (e.g., exit gate versus entry gate), and may be labeled with a direction between two or more frames (e.g., toward an entry gate, away from an entry gate, toward an exit gate, away from an exit gate). Lane type may be derived by environmental factors (e.g., a model may be trained to recognize through enough example data that a direction past a gate that shows blue sky is an exit direction, and toward a halogen light is an entry direction). From this training, the first machine learning model may output direction directly based on learned motions relative to gate type and/or lane type, or may output lane type and/or gate type as well as indicia of directional movement, from which entry detection module 212 may apply heuristics to determine the direction attributes (e.g., toward entry gate, away from entry gate, toward exit gate, away from exit gate). That is, a direction vector along with a gate type and/or lane type may be output (e.g., environmental factors may be output along with the direction vector, which may include other information such as lighting, sky information, and so on), and the direction vector along with the environmental factors may be used to determine the direction attribute.

It is advantageous to determine direction along with identifying the vehicle, as vehicles are being tracked as they move and so identifying both direction and the vehicle itself in one step results in false positives. With that being said, a separate model could be used for vehicle detection and for direction detection, thus resulting in a three-model approach (two models being used for what above is referenced to as a "first machine learning model", each of those separate models trained separately using respective training data for each respective task.

Continuing on with the two-model approach, entry detection module 212 may determine a vehicle identifier of the vehicle by inputting images of the subset featuring a depiction of a license plate of the vehicle into a second machine learning model. That is, rather than using optical character recognition (OCR), a machine learning model may be used to decipher a license plate of a vehicle into a vehicle identifier. OCR methods are often inaccurate for license plate detection due to complexity of license plates, where different fonts (e.g., cursive versus script) are used, often against complex picture-filled backgrounds, different colors, and lighting issues. Moreover, various license plate types are difficult to accurately read because they often include slogans that are not generalizable. Even minor accuracies in OCR readings where one character or a geographical identifier determination is off could cause could result in an inability to effectively identify a vehicle.

To this end, the second machine learning model may be trained to identify both the geographical nomenclature and the string of characters of a vehicle identifier using training example images of license plates, where each of the training example images is labeled with its corresponding geographical nomenclature and string of characters. As used herein, the term "geographical nomenclature" may refer to a manner of identifying a jurisdiction that issued the license plate. That is, in the United States of America, an individual state would issue a license plate, and the geographical identifier would identify that state. In some jurisdictions, a country-wide license plate is issued, in which case the geographical identifier is an identifier of the country. A geographical identifier may identify more than one jurisdiction (e.g., in the European Union (EU), some license plates identify both the EU and the member nation that issued the license plate; the geographical identifier may identify both of those places or just the member nation). The term "string of characters" may refer to a unique symbol issued by the jurisdiction to uniquely identify the vehicle, such as a "license plate number" (which may include numbers, letters, and symbols). That is, for each given jurisdiction, the string of characters is unique relative to other strings of characters issued by that given jurisdiction.

In order to train the second machine learning model, training examples of images of license plates are used, where the training examples are labeled. In an embodiment, the training examples are labeled with both the geographical jurisdiction and with characters that are depicted within the image. The characters may be individually labeled (e.g., by labeling segments of the image that include the segment), the whole image may be labeled with each character that is present, or a combination thereof. In an embodiment, the training examples may be labeled only with the geographical jurisdiction, and the second machine learning model predicts for a new image of a license plate the geographical jurisdiction. Following this prediction, a third machine learning model from a plurality of candidate machine learning models may be selected, each of the candidate machine learning models corresponding to a different geographical jurisdiction and trained to predict characters of the string of characters from training examples specific to its respective geographical jurisdiction, the selected third machine learning model selected based on the predicted geographical jurisdiction. The third machine learning model may be applied to the image or segments thereof that contain each character, thus resulting in a prediction from training examples specific to that jurisdiction.

In any case, the training examples may show examples in any number of conditions, from low lighting conditions, dirty license plate conditions where characters are partially or fully occluded, license plate frame conditions where geographical identifiers (e.g., the word "New York") are partially or fully occluded, license plate covers render characters hard to directly read, and so on. Advantageously, by using machine learning to predict geographical nomenclature and strings of characters, accuracy is improved relative to OCR, as even where partial occlusion occurs or lighting conditions make characters difficult to read, the second machine learning model is able to accurately predict the content of the license plate.

The trained second machine learning model may output the geographical nomenclature and string of characters (e.g., either directly, or with a confidence score that exceeds a threshold applied by entry detection module 212. With all information of the data set determined (e.g., the plurality of parameters and the vehicle identifier), edge device 110 may store or cause to be stored a data structure for the data set in association with one or more timestamps with the subset of images. In an embodiment, the data structure is stored at edge device 110. In an embodiment, the data structure is stored at parking control server 130. The data structure may include additional information, such as time stamps and/or sequence number of images in which the images featuring the respective vehicle appeared.

In a one-model approach, the manners of training the first and second machine learning model would be applied to a single model, rather than differentiating what is learned between the two models. This would result in an advantage of providing all inputs as one data set to a model, but could also result in a disadvantage of a less specialized model that has noisier output. Moreover, data and time intensive to train one large model to perform all of this functionality. The large model may be slower and have a lower quality of output than using two separate models. The two-model approach additionally allows for a "fail fast" processing to happen—that is, detect a vehicle and perform processing based on that detection, even before other activity (e.g., license plate reading) is completed.

Regardless of what model approach is used, in an embodiment, entry detection module 212 may determine, from direction attributes of the vehicle, whether the direction attributes are consistent with an entry motion. That is, where entry detection module 212 determines that a vehicle is approaching a gate (e.g., in an entry lane) with direction attributes consistent with that gate's function (e.g., using the entry lane as opposed to the exit lane), entry detection module 212 may determine that an entry motion has occurred. Responsive to detecting that an entry motion has occurred, entry detection module 212 may move the gate to enable entry to the facility that is blocked by the gate (or where the gate is a logical boundary, record that the vehicle has entered the facility without a need to move the gate). Also responsive to detecting that the entry motion has occurred, entry detection module 212 may store a data structure in an entry corresponding to the vehicle in a database. For example, this may be stored in entry data database 358, discussed in further detail below for use in matching an exit motion to an entry motion by a same vehicle. In an embodiment, further responsive to detecting that the entry motion has occurred, the data structure may also be stored in profile database 356 with reference to the vehicle or a user of the vehicle to record historical activity of that vehicle in entering facilities.

Exit detection module 214 operates in a manner similar to entry detection module 212, in that machine learning is applied in the same manner, except to detect an exit event. That is, a data set identical to that collected when a vehicle performs an entry motion is performed for an exit motion, where it is detected that a vehicle is approaching gate 114 to exit a facility. When an exit motion is detected (e.g., where a vehicle is determined to have directional attributes consistent with approaching a gate designated for use as an exit), exit detection module 214 determines that an exit event may have occurred (e.g., and other activity such as generation and storage of a data structure as described with respect to entry events may be performed). Exit event module 216 compares the information of the data set obtained by exit detection module 214 to information stored in data structures of entry events and determines whether a match exists. Exit event module 216 determines a match where heuristics are satisfied, such a data structure indicating that a vehicle having a same geographical nomenclature entered the facility. Because license plate reading, even using the described second machine learning model, is not perfect, it may be the case that a match is not found by exit event module 216 of geographical nomenclature alone. To this end, a match may be determined based on other identifying information, such as identifying a partial match of a geographical nomenclature and/or other vehicle attributes that match such as make, model, color, and so on. Any heuristics may be programmed to determine whether or not a match has occurred. Responsive to detecting ga match, exit event module 216 may instruct the data structure to be updated to indicate that a vehicle has exited the facility, and/or may raise gate 114 (e.g., where gate 114 is a physical gate rather than a logical boundary), thus allowing the vehicle to exit the facility.

Responsive to determining that there is no match, administrator alert module 218 may alert to an administrator, who may manually determine whether there is a match and/or communicate with a driver of the vehicle to take remedial action. In an embodiment, where there is no match, administrator alert module 218 may determine that the vehicle identifier is unknown. Responsive to determining that the vehicle identifier is unknown, administrator alert module 218 may transmit an alert to an administrator, the alert associated with at least a portion of the subset of images. That is, the alert may point to one or more images or portions that include identifying information (e.g., license plate, differentiating feature like a bumper sticker, and so on). Administrator alert module 218 may receive, from the administrator, input that specifies the vehicle identifier, and may use that input to find matching entry data.

In an embodiment, edge device 110 applies computer vision to determine environmental factors around the vehicle. The term environmental factors, as used herein, may refer to features that influence traffic flow in the vicinity of gate 114, such as street traffic blocking egress from a facility, orientation of vehicles within images with respect to one another, and so on. In an embodiment, when instructing the moveable gate to move, edge device 110 applies parameters to based on the determined environmental factors (e.g., wait to open gate 114 despite matching an exit to an entry due to a vehicle being ahead of the vehicle attempting to exit and therefore blocking egress).

Figure 3:
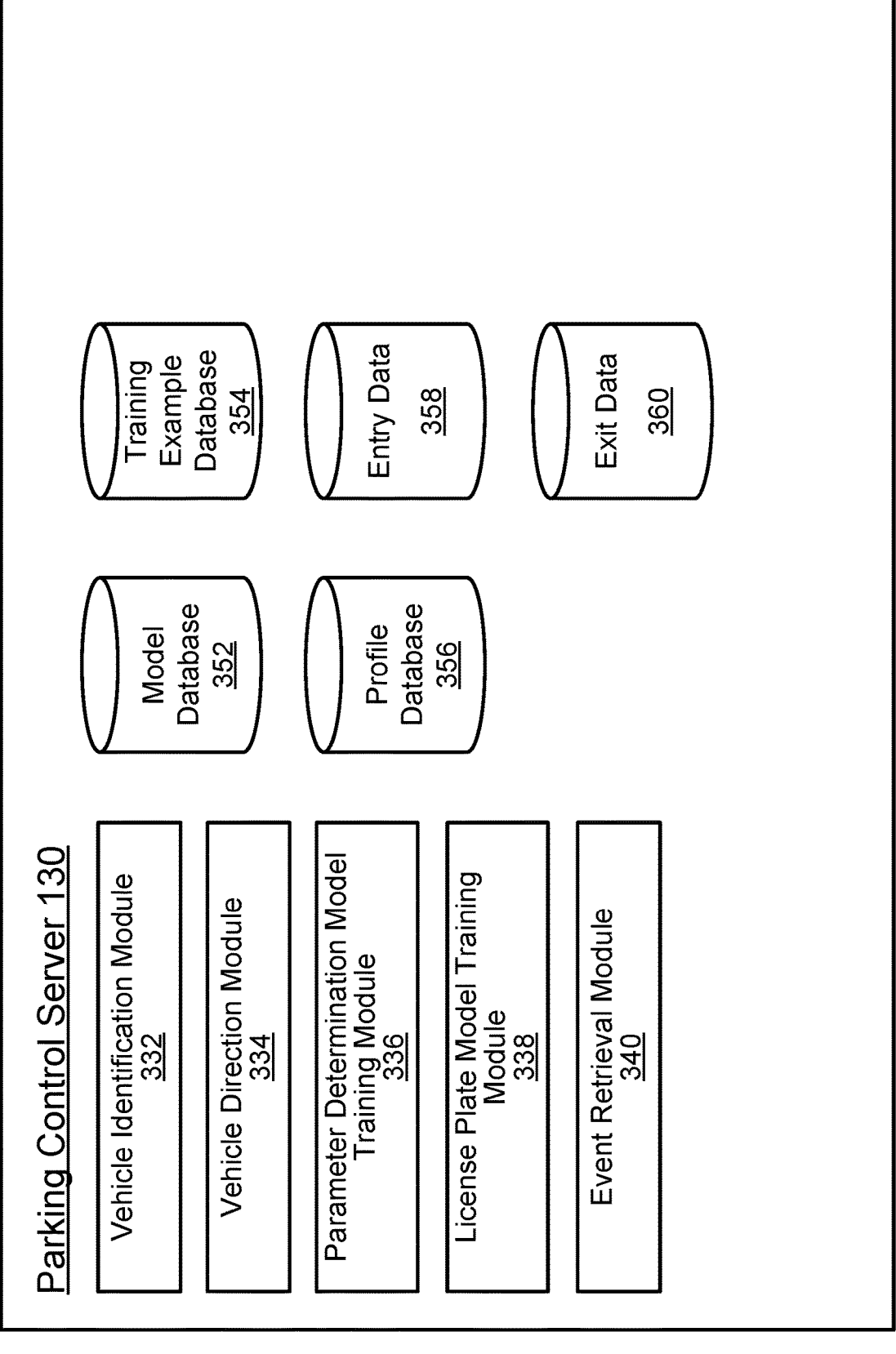
FIG. 3 illustrates one embodiment of exemplary modules operated by a parking control server.

FIG. 3 illustrates one embodiment of exemplary modules operated by a parking control server. As depicted in FIG. 3, parking control server 130 includes vehicle identification module 332, vehicle direction module 334, parameter determination model training module 336, license plate model training module 338, event retrieval module 340, model database 352, profile database 356, training example database 354, entry data 358, and exit data 360. The modules and databases depicted in FIG. 3 are merely exemplary, and fewer or more modules and/or databases may be used to achieve the activity that is disclosed herein. Moreover, the modules and databases, though depicted in parking control server 130, may be distributed, in whole or in part, to edge device 110, which may perform, in whole or in part, any activity described with respect to parking control server 130. Yet further, the modules and databases may be maintained separate from any entity depicted in FIG. 1 (e.g., determination model training module 336 and license plate training module 338 may be housed entirely offline or in a separate entity from parking control server 130).

Vehicle identification module 332 identifies a vehicle using the first machine learning model described with respect to entry detection module 212. In particular, vehicle identification module 332 accesses the first machine learning model from model database 352, and applies input images and/or any other data to the machine learning model, receiving parameters of the vehicle therefrom. Vehicle identification module 332 acts in the scenario where images are transmitted to parking control server 130 for processing, rather than being processed by edge device 110. Similarly, vehicle direction module 334 determines a direction of a vehicle within images captured at edge device 110 by cameras 112 in the manner described above with respect to entry detection module 212, except by using images and/or other data received at parking control server 130 as input, rather than being processed by edge device 110.

Parameter determination model training module 336 trains the first machine learning model to predict parameters of vehicles in the manner described above with respect to entry detection module 212. Parameter determination model training module may additionally train the first machine learning model to predict direction of a vehicle. Parameter determination model training module may access training examples from training example database 354 and may store the models at model database 352. Similarly, license plate model training module 338 may train the second machine learning model using training examples stored at training example database 354 and may store the trained model at model database 352.

Event retrieval module 340 receives instructions from exit event module 216 to retrieve entry data from entry data database 358 that matches detected exit data, and returns at least partially matching data and/or a decision as to whether a match is found to exit event module 216. Event retrieval module 340 optionally stores the exit data to exit data database 360.

Profile database 356 stores profile data for vehicles that are encountered. For example, identifying information and/or license plate information may be used to index profile database 356. As a vehicle enters and exits facilities, profile database 356 may be populated with profiles for each vehicle that store those entry and exit events. Profiles may indicate owners and/or drivers of vehicles and may indicate contact information for those users. Event retrieval module 340 may retrieve contact information when an event is detected and may initiate communications with the user (e.g., welcome to parking facility message, or other information relating to usage of the facility).

Figure 4:
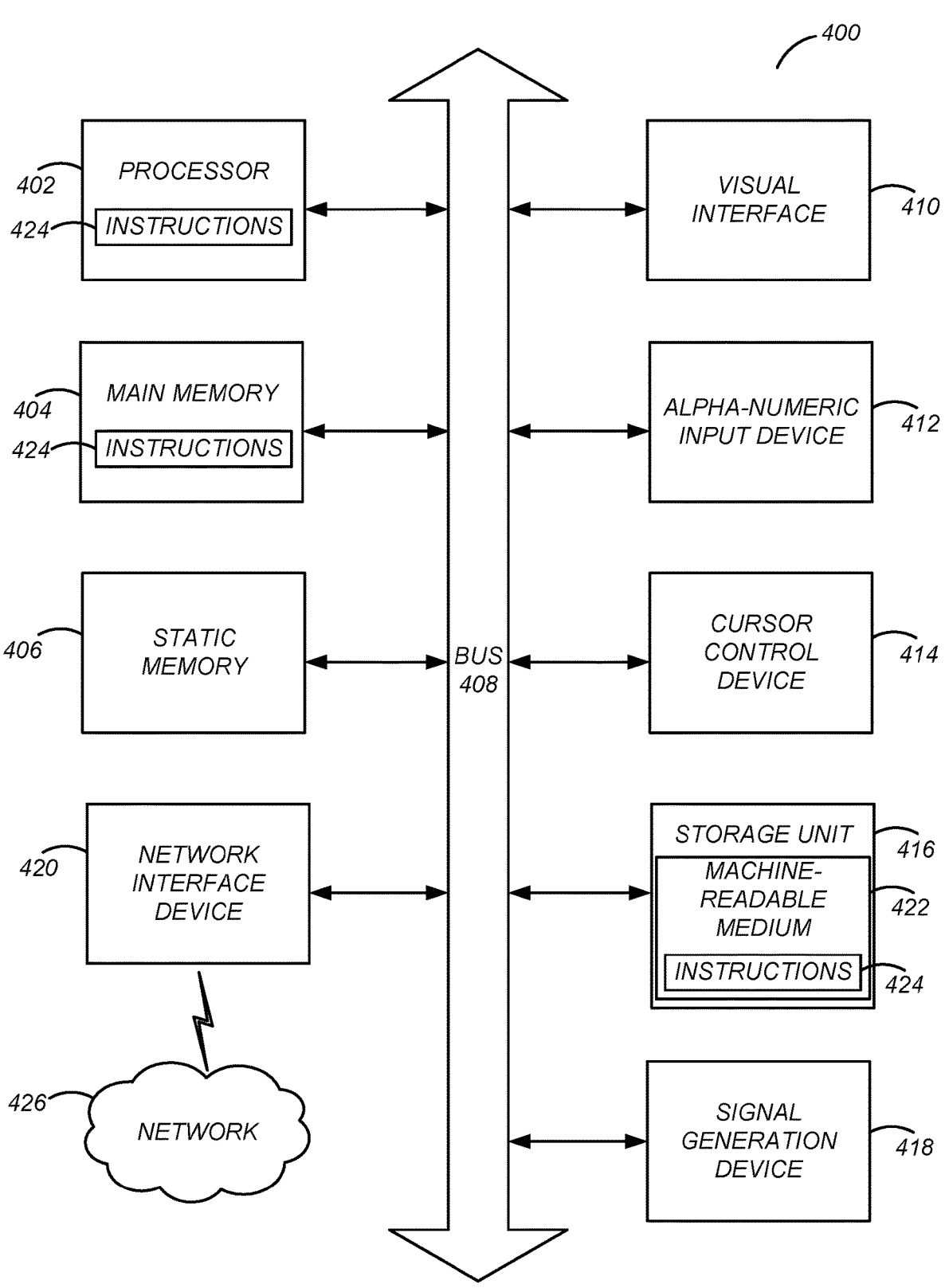
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). FIG. (FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 404, and a static memory 406, which are configured to communicate with each other via a bus 408. The computer system 400 may further include visual display interface 410. The visual interface may include a software driver that enables (or provide) user interfaces to render on a screen either directly or indirectly. The visual interface 410 may interface with a touch enabled screen. The computer system 400 may also include input devices 412 (e.g., a keyboard a mouse), a storage unit 416, a signal generation device 418 (e.g., a microphone and/or speaker), and a network interface device 420, which also are configured to communicate via the bus 408.

The storage unit 416 includes a machine-readable medium 422 (e.g., magnetic disk or solid-state memory) on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution.

Figure 5:
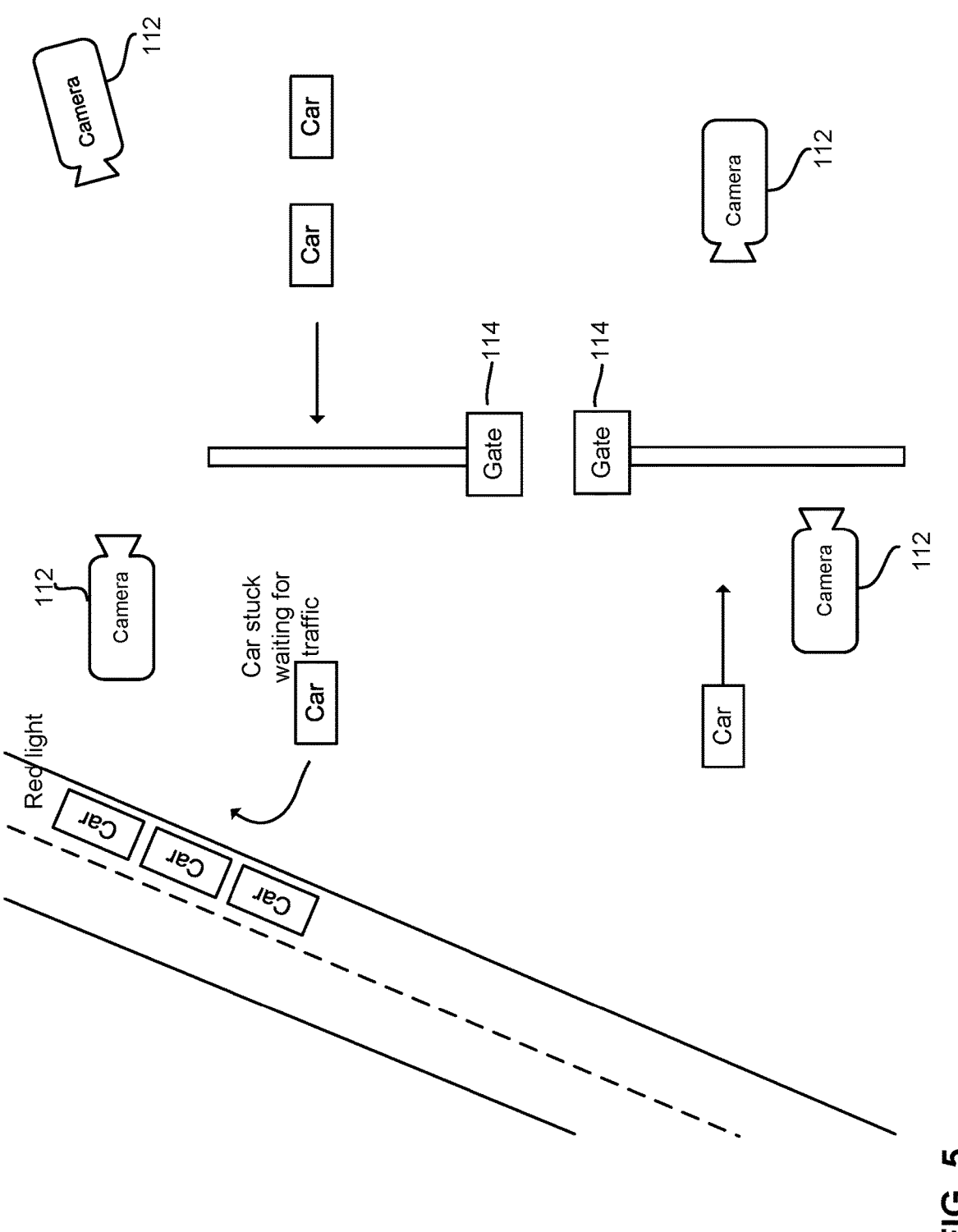
FIG. 5 depicts one embodiment of an exemplary vicinity around a moveable gate in a parking facility.

FIG. 5 depicts one embodiment of an exemplary vicinity around a moveable gate in a parking facility. As depicted in FIG. 5, a street is depicted on the left hand side, with traffic preventing a vehicle in an exit lane from exiting. This in turn prevents a vehicle behind an exit gate 114 from exiting. Cameras 112 are depicted that are used by an edge device (not depicted) in the manner described herein. A vehicle on the lower entry lane is captured approaching a moveable gate to enter the facility.

Figure 6:
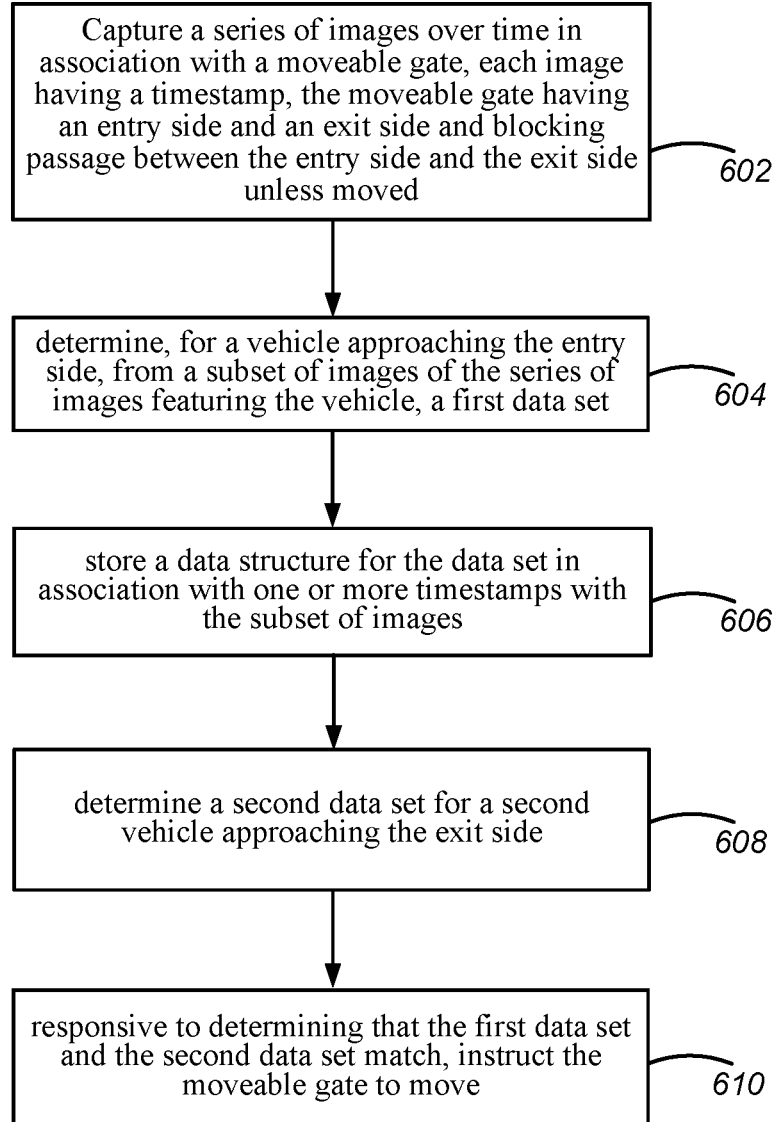
FIG. 6 depicts one embodiment of an exemplary process for seamlessly operating a parking gate without manual operation by a vehicle driver.

FIG. 6 depicts one embodiment of an exemplary process for seamlessly operating a parking gate without manual operation by a vehicle driver. Process 600 operates with one or more processors (e.g., processor 402 of edge device 110 and/or of parking control server 130) executing instructions (e.g., instructions 424) that cause one or more modules to perform their respective operations. Process 600 begins with edge device 110 capturing 602 a series of images over time in association with a moveable gate (e.g., using entry detection module 212 in concert with data from camera 112), each image having a timestamp, the moveable gate (e.g., gate 114) having an entry side and an exit side and blocking passage between the entry side and the exit side unless moved. Edge device 110 determines, for a vehicle approaching the entry side, from a subset of images of the series of images featuring the vehicle, a first data set (e.g., including vehicle identification attributes and/or directional attributes and/or license plate information using the first and second machine learning models). Edge device 110 stores 606 a data structure for the data set in association with one or more timestamps with the subset of images. Edge device 110 determines 608 a second data set for a second vehicle approaching the exit side (e.g., using exit detection module 214) and, responsive to determining 610 that the first data set and the second data set match, instructing the moveable gate to move (e.g., using exit event module 216). In embodiments where gate 114 is a logical boundary, process 600 operates without a need to move the gate, and instead may record the entry and exit activity of the vehicle without moving the gate.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for seamless entry and exit to a parking facility blocked by a moveable gate through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

capturing, using an edge device, a series of images over time in association with a moveable gate, each image having a timestamp, the moveable gate having an entry side and an exit side and blocking passage between the entry side and the exit side unless moved;

determining, by the edge device, for a vehicle approaching the entry side, from a subset of images of the series of images featuring the vehicle processed by the edge device, a first data set comprising:

a plurality of parameters that describe attributes of the vehicle by inputting the subset of images into a first machine learning model, wherein the plurality of parameters comprise identifying attributes of the vehicle and direction attributes of the vehicle; and a vehicle identifier of the vehicle by inputting images of the subset featuring a depiction of a license plate of the vehicle into a second machine learning model;

transmitting an instruction, by the edge device, to a server remote from the edge device, for the server to store a data structure for the data set in association with one or more timestamps with the subset of images, wherein storing the data structure occurs responsive to determining that the direction attributes of the vehicle are consistent with an entry motion;

determining a second data set for a second vehicle approaching the exit side; and responsive to a determination at the server that the first data set and the second data set match, instructing, by the edge device, the moveable gate to move.

2. The method of claim 1, wherein the first machine learning model is trained to output the identifying attributes of the vehicle using example data comprising images of vehicles that are labeled with one or more candidate identifying attributes.

3. The method of claim 1, wherein the first machine learning model is trained to output the direction attributes of the vehicle using example data comprising sequences of images of vehicles that are labeled as corresponding to an entry motion or an exit motion.

4. The method of claim 1, wherein the first machine learning model is trained to output the direction attributes of the vehicle using example data comprising sequences of images of vehicles that are labeled as corresponding to a given directional vector, and wherein the method further comprises determining whether the direction attributes correspond go an entry motion or an exit motion based on an output of a directional vector from the first machine learning model as compared to environmental factors surrounding the moveable gate.

5. The method of claim 1, wherein the vehicle identifier comprises geographical nomenclature and a string of characters.

6. The method of claim 5, wherein the second machine learning model is trained to identify the geographical nomenclature and the string of characters using training example images of license plates, where each of the training example images is labeled with its corresponding geographical nomenclature and string of characters.

7. The method of claim 1, wherein determining the vehicle identifier for first data set comprises determining that the vehicle identifier is unknown, and wherein the method further comprises:

transmitting an alert to an administrator, the alert associated with at least a portion of the subset of images, and receiving, from the administrator, input that specifies the vehicle identifier.

8. The method of claim 1, further comprising:

applying computer vision to determine environmental factors around the vehicle; and when instructing the moveable gate to move, applying parameters to the instructing based on the determined environmental factors.

9. A non-transitory computer-readable medium with memory encoded thereon comprising instructions that, when executed by one or more processors, cause the one or more processors to perform operations, the instructions comprising instructions to:

capture, using an edge device, a series of images over time in association with a moveable gate, each image having a timestamp, the moveable gate having an entry side and an exit side and blocking passage between the entry side and the exit side unless moved;

determine, by the edge device, for a vehicle approaching the entry side, from a subset of images of the series of images featuring the vehicle processed by the edge device, a first data set comprising:

a plurality of parameters that describe attributes of the vehicle by inputting the subset of images into a first machine learning model, wherein the plurality of parameters comprise identifying attributes of the vehicle and direction attributes of the vehicle; and a vehicle identifier of the vehicle by inputting images of the subset featuring a depiction of a license plate of the vehicle into a second machine learning model;

transmit an instruction, by the edge device, to a server remote from the edge device, for the server to store a data structure for the data set in association with one or more timestamps with the subset of images, wherein storing the data structure occurs responsive to determining that the direction attributes of the vehicle are consistent with an entry motion;

determine a second data set for a second vehicle approaching the exit side; and responsive to a determination at the server that the first data set and the second data set match, instruct, by the edge device, the moveable gate to move.

10. The non-transitory computer-readable medium of claim 9, wherein the first machine learning model is trained to output the identifying attributes of the vehicle using example data comprising images of vehicles that are labeled with one or more candidate identifying attributes.

11. The non-transitory computer-readable medium of claim 9, wherein the first machine learning model is trained to output the direction attributes of the vehicle using example data comprising sequences of images of vehicles that are labeled as corresponding to an entry motion or an exit motion.

12. The non-transitory computer-readable medium of claim 9, wherein the first machine learning model is trained to output the direction attributes of the vehicle using example data comprising sequences of images of vehicles that are labeled as corresponding to a given directional vector, and wherein the instructions further comprise instructions to determine whether the direction attributes correspond go an entry motion or an exit motion based on an output of a directional vector from the first machine learning model as compared to environmental factors surrounding the moveable gate.

13. The non-transitory computer-readable medium of claim 9, wherein the vehicle identifier comprises geographical nomenclature and a string of characters.

14. The non-transitory computer-readable medium of claim 13, wherein the second machine learning model is trained to identify the geographical nomenclature and the string of characters using training example images of license plates, where each of the training example images is labeled with its corresponding geographical nomenclature and string of characters.

15. The non-transitory computer-readable medium of claim 9, wherein determining the vehicle identifier for first data set comprises determining that the vehicle identifier is unknown, and wherein the instructions further comprise instructions to:

transmitting an alert to an administrator, the alert associated with at least a portion of the subset of images; and receiving, from the administrator, input that specifies the vehicle identifier.

16. A system comprising:

memory with instructions encoded thereon; and one or more processors that, when executing the instructions, are caused to perform operations, the operations comprising:

capturing, using an edge device, a series of images over time in association with a moveable gate, each image having a timestamp, the moveable gate having an entry side and an exit side and blocking passage between the entry side and the exit side unless moved;

determining, by the edge device, for a vehicle approaching the entry side, from a subset of images of the series of images featuring the vehicle processed by the edge device, a first data set comprising:

a plurality of parameters that describe attributes of the vehicle by inputting the subset of images into a first machine learning model, wherein the plurality of parameters comprise identifying attributes of the vehicle and direction attributes of the vehicle; and a vehicle identifier of the vehicle by inputting images of the subset featuring a depiction of a license plate of the vehicle into a second machine learning model;

transmitting an instruction, by the edge device, to a server remote from the edge device, for the server to store a data structure for the data set in association with one or more timestamps with the subset of images, wherein storing the data structure occurs responsive to determining that the direction attributes of the vehicle are consistent with an entry motion;

determining a second data set for a second vehicle approaching the exit side; and responsive to a determination at the server that the first data set and the second data set match, instructing, by the edge device, the moveable gate to move.

\* \* \* \* \*